(12) United States Patent
Kim et al.

(10) Patent No.: US 12,487,775 B2
(45) Date of Patent: Dec. 2, 2025

(54) ELECTRONIC DEVICE FOR DETECTING ERROR IN FIELD OF PROTOCOL INFORMATION UNIT AND METHOD OF OPERATING THE SAME

(71) Applicant: SK hynix Inc., Gyeonggi-do (KR)

(72) Inventors: Byung Jun Kim, Gyeonggi-do (KR); Ji Wook Kim, Gyeonggi-do (KR); Young Woo Lee, Gyeonggi-do (KR); Won Kyoo Lee, Gyeonggi-do (KR); Taek Gyu Lee, Gyeonggi-do (KR); Young Kyu Jeon, Gyeonggi-do (KR); Kyoung Ku Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 139 days.

(21) Appl. No.: 18/481,234

(22) Filed: Oct. 5, 2023

(65) Prior Publication Data

US 2024/0329877 A1   Oct. 3, 2024

(30) Foreign Application Priority Data

Mar. 28, 2023   (KR) .......................... 10-2023-0040502

(51) Int. Cl.
 *G06F 3/06* (2006.01)
(52) U.S. Cl.
 CPC .......... *G06F 3/0658* (2013.01); *G06F 3/0619* (2013.01); *G06F 3/0673* (2013.01)

(58) Field of Classification Search
 None
 See application file for complete search history.

(56) References Cited

U.S. PATENT DOCUMENTS

| | | | | |
|---|---|---|---|---|
| 10,599,591 | B2 * | 3/2020 | Lee | G06F 3/061 |
| 11,275,527 | B1 * | 3/2022 | Spector | G06F 13/1642 |
| 11,513,980 | B2 * | 11/2022 | Chen | G06F 3/0661 |
| 11,681,638 | B2 * | 6/2023 | Kim | G06F 13/1689 |
| | | | | 710/104 |
| 12,072,764 | B2 * | 8/2024 | Rapalli | G06F 11/108 |
| 2022/0100425 | A1 * | 3/2022 | Ryu | G06F 3/0659 |

FOREIGN PATENT DOCUMENTS

| | | |
|---|---|---|
| KR | 10-2017-0013269 A | 2/2017 |
| KR | 10-2022-0102540 A | 7/2022 |

\* cited by examiner

*Primary Examiner* — Elias Mamo
(74) *Attorney, Agent, or Firm* — IP & T GROUP LLP

(57) ABSTRACT

Provided herein may be an electronic device and a method of operating the same. The electronic device may include a memory device, and a controller configured to receive an inbound protocol information unit (PIU) from an external device and control the memory device based on the inbound PIU, wherein the inbound PIU includes a basic header segment including information about an extra header segment (EHS) length, and an extra header segment defined by the EHS length, and wherein the controller is configured to generate an error message depending on whether the PIU includes an error related to the extra header segment.

20 Claims, 8 Drawing Sheets

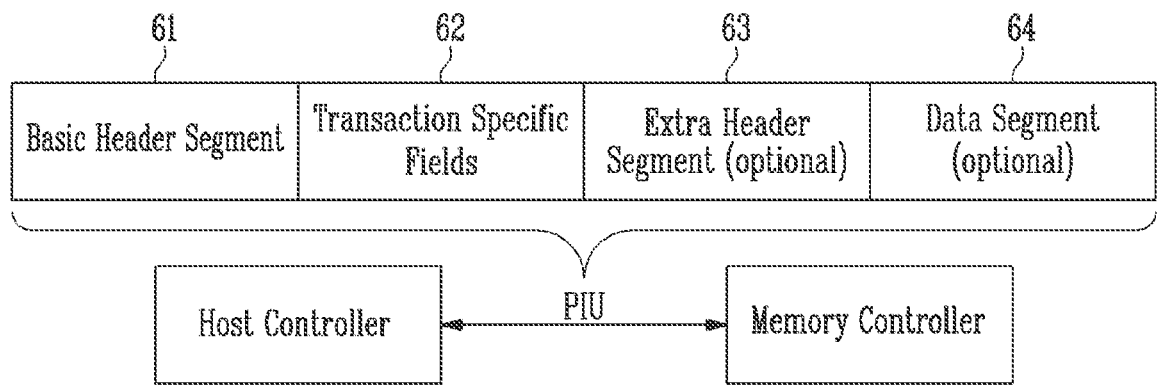

| Bit<br>Byte | 7 | 6 | 5 | 4 | 3 | 2 | 1 | 0 |
|---|---|---|---|---|---|---|---|---|
| 0 | OPERATION CODE ||||||||
| 1 | SECURITY PROTOCOL ||||||||
| 2 | SECURITY PROTOCOL SPECIFIC ||||||||
| 3 | ||||||||
| 4 | INC_512<br>=0b | Reserved |||||||
| 5 | Reserved ||||||||
| 6 | (MSB) | ALLOCATION/TRANSFER LENGTH |||||||
| 9 | | | | | | | | (LSB) |
| 10 | Reserved ||||||||
| 11 | CONTROL = 00h ||||||||

ELECTRONIC DEVICE FOR DETECTING ERROR IN FIELD OF PROTOCOL INFORMATION UNIT AND METHOD OF OPERATING THE SAME

CROSS-REFERENCE TO RELATED APPLICATION

The present application claims priority under 35 U.S.C. § 119(a) to Korean patent application number 10-2023-0040502 filed on Mar. 28, 2023, the entire disclosure of which is incorporated by reference herein.

BACKGROUND

1. Field of Invention

Various embodiments of the present disclosure generally relate to an electronic device, and more particularly to an electronic device for detecting an error in the field of a protocol information unit and a method of operating the electronic device.

2. Description of Related Art

A storage device is a device which stores data under the control of a host device such as a computer or a smartphone. The storage device may include a memory device in which data is stored and a memory controller which controls the memory device. Memory devices may be classified into a volatile memory device and a nonvolatile memory device.

The storage device may communicate with the host device using data packets called protocol information units. When a protocol information unit is generated using a method that does not comply with a predefined standard, there is a need to discard the protocol information unit without transmitting the protocol information unit.

SUMMARY

Various embodiments of the present disclosure are directed to an electronic device that is capable of detecting an error in the field of a protocol information unit.

An embodiment of the present disclosure may provide for an electronic device. The electronic device may include a memory device, and a controller configured to receive an inbound protocol information unit (PIU) from an external device and control the memory device based on the inbound PIU, wherein the inbound PIU includes a basic header segment including information about an extra header segment (EHS) length, and an extra header segment defined by the EHS length, and wherein the controller is further configured to generate an error message depending on whether the inbound PIU includes an error related to the extra header segment.

An embodiment of the present disclosure may provide for a method of operating an electronic device communicating with an external device through a protocol information unit (PIU). The method of operating the electronic device may include receiving the PIU from the external device, obtaining an extra header segment (EHS) length from the PIU, and generating an error message when the EHS length is equal to or greater than a first value.

An embodiment of the present disclosure may provide for a storage device. The storage device include a memory device; and a controller configured to control, based on a protocol information unit (PIU), the memory device to operate while discarding, without controlling the memory device, the PIU when the PIU includes a value of an extra header segment (EHS) length and the value is greater than a threshold.

BRIEF DESCRIPTION OF THE DRAWINGS

FIG. 3 is a diagram for describing a data communication unit between a host controller and a memory controller.

FIG. 4 is a diagram for describing the structure of a basic header segment of a protocol information unit (PIU) included in a command.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
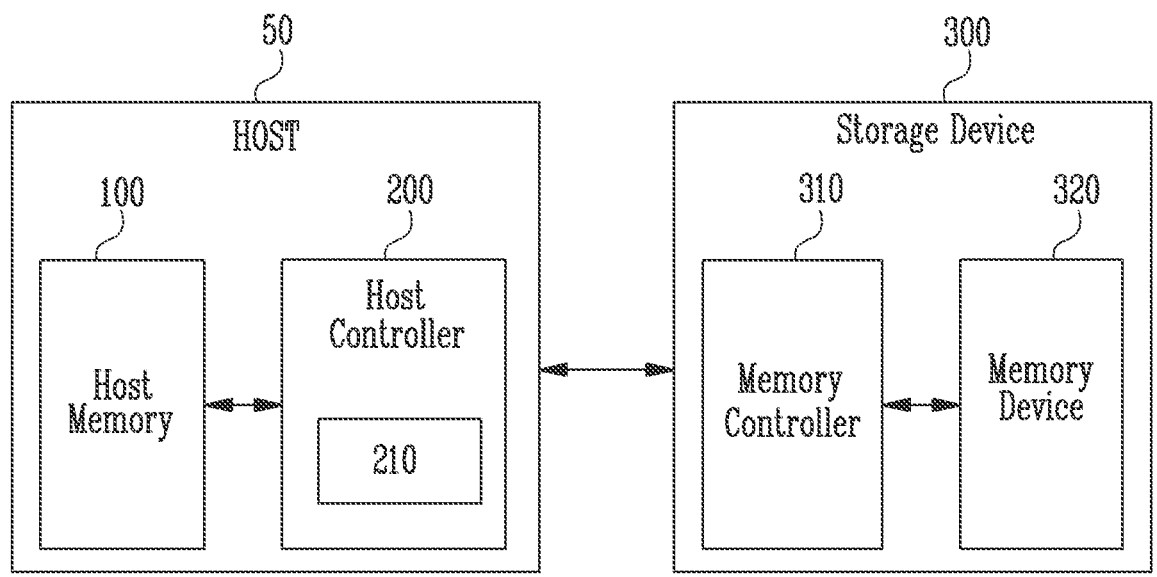
FIG. 1 is a block diagram of a storage system according to an embodiment of the present disclosure.

FIG. 1 is a block diagram of a storage system according to an embodiment of the present disclosure.

Referring to FIG. 1, the storage system may include a host 50 and a storage device 300. The host 50 may include a host memory 100 and a host controller 200.

The host controller 200 may manage an operation of storing data, stored in the host memory 100, in a memory device 320 of the storage device 300 or storing data, stored in the memory device 320 of the storage device 300, in the host memory 100.

In some embodiments, the host controller 200 and the host memory 100 may be implemented as separate semiconductor chips. Alternatively, in some embodiments, the host controller 200 and the host memory 100 may be integrated into the same semiconductor chip. Details of the host 50 will be described later with reference to FIG. 2.

The storage device 300 may include the memory device 320 and a memory controller 310. The storage device 300 may be a device which stores data under the control of the host 50, such as a mobile phone, a smartphone, an MP3 player, a laptop computer, a desktop computer, a game console, a TV, a tablet PC, or an in-vehicle infotainment system. Alternatively, the storage device 300 may be a device which stores large-capacity data in one place, such as a server or a data center, under the control of the host 50.

The storage device 300 may be manufactured as any of various types of storage devices depending on a host interface which is a scheme for communication with the host 50. For example, the storage device 300 may be implemented as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-e or PCIe) card-type storage device, a compact flash (CF) card, a smart media card, and a memory stick.

The storage device 300 may be manufactured in any of various types of package forms. For example, the storage device 300 may be manufactured in any of various types of package forms, such as package on package (POP), system in package (SIP), system on chip (SOC), multi-chip package (MCP), chip on board (COB), wafer-level fabricated package (WFP), and wafer-level stack package (WSP).

The memory device 320 may store data. The memory device 320 may be operated under the control of the memory controller 310. The memory device 320 may include a memory cell array (not illustrated) including a plurality of memory cells which store data.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The memory cell array (not illustrated) may include a plurality of memory blocks. Each memory block may include a plurality of memory cells. Each memory block may include a plurality of pages. In some embodiments, a page may be the unit by which data is stored in the memory device 320 or the unit by which data stored in the memory device 320 is read. A memory block may be the unit by which data is erased.

In some embodiments, the memory device 320 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory, a resistive RAM (RRAM), a phase-change RAM (PRAM), a magnetoresistive RAM (MRAM), a ferroelectric RAM (FRAM), or a spin transfer torque RAM (STT-RAM). In the present specification, for convenience of description, description is made on that the memory device 320 is a NAND flash memory.

The memory device 320 may receive a command and an address from the memory controller 310, and may access the area of the memory cell array, selected by the address. The memory device 320 may perform an operation indicated by the command on the area selected by the address. For example, the memory device 320 may perform a write operation (i.e., a program operation), a read operation, and an erase operation. During a program operation, the memory device 320 may program data to the area selected by the address. During a read operation, the memory device 320 may read data from the area selected by the address. During an erase operation, the memory device 320 may erase data stored in the area selected by the address.

The memory controller 310 may control the overall operation of the storage device 300.

When power is applied to the storage device 300, the memory controller 310 may run firmware (FW). When the memory device 320 is a flash memory device, the memory controller 310 may run firmware such as a flash translation layer (FTL) for controlling communication between the host 50 and the memory device 320.

In some embodiments, the memory controller 310 may receive data and a logical block address (LBA) from the host 50, and may translate the logical block address (LBA) into a physical block address (PBA) indicating the address of memory cells which are included in the memory device 320 and in which data is to be stored.

The memory controller 310 may control the memory device 320 so that a program operation, a read operation or an erase operation is performed in response to a request received from the host 50. During a program operation, the memory controller 310 may provide a program command, a physical block address, and data to the memory device 320. During a read operation, the memory controller 310 may provide a read command and a physical block address to the memory device 320. During an erase operation, the memory controller 310 may provide an erase command and a physical block address to the memory device 320.

Here, in the present specification, information transmitted/received between the host 50 and the memory controller 310 may be referred to as a request or a command. In some embodiments, the host 50 and the memory controller 310 may communicate with each other using data packets referred to as "protocol information units (PIU)". A PIU may be a type of data packet generated based on a predefined standard. In some embodiments, a PIU may include a basic header segment, a transaction specific field, an extra header segment, and a data segment. Detailed description thereof will be made later with reference to FIG. 3.

In some embodiments, the host controller 200 may include an extra header segment (EHS) error processor 210. In some embodiments, the EHS error processor 210 may perform an EHS error processing operation on the PIU generated by the host 50 or a PIU received from the storage device 300. The EHS error processing operation may be an operation of discarding a PIU containing an EHS error depending on whether the PIU contains the EHS error.

An EHS error may indicate the case where the EHS included in the PIU does not comply with a predefined standard. For example, the EHS error may be the case where a type of PIU that does not support an EHS in the standard includes an EHS, or the case where the PIU includes an EHS having a length equal to or greater than the length supported in the standard. That is, the EHS error may refer to the incorrect usage of the EHS.

Furthermore, in the present specification, information provided by the memory controller 310 to the memory device 320 may be referred to as a command. In some embodiments, the memory controller 310 may internally generate a command, an address, and data regardless of whether a request from the host 50 is received and may transmit them to the memory device 320. For example, the memory controller 310 may provide the memory device 320 with commands, addresses, and data required in order to perform a program operation, a read operation, and erase operations that are involved in performing wear leveling, read reclaim, garbage collection, etc.

In some embodiments, the memory controller 310 may control two or more memory devices 320. In this case, the memory controller 310 may control the memory devices 320 depending on an interleaving scheme to improve operating performance. The interleaving scheme may be a scheme for controlling the memory devices 320 so that the operations of at least two memory devices 320 are caused to overlap each other.

The host 50 may communicate with the storage device 300 using at least one of various communication standards or interfaces such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
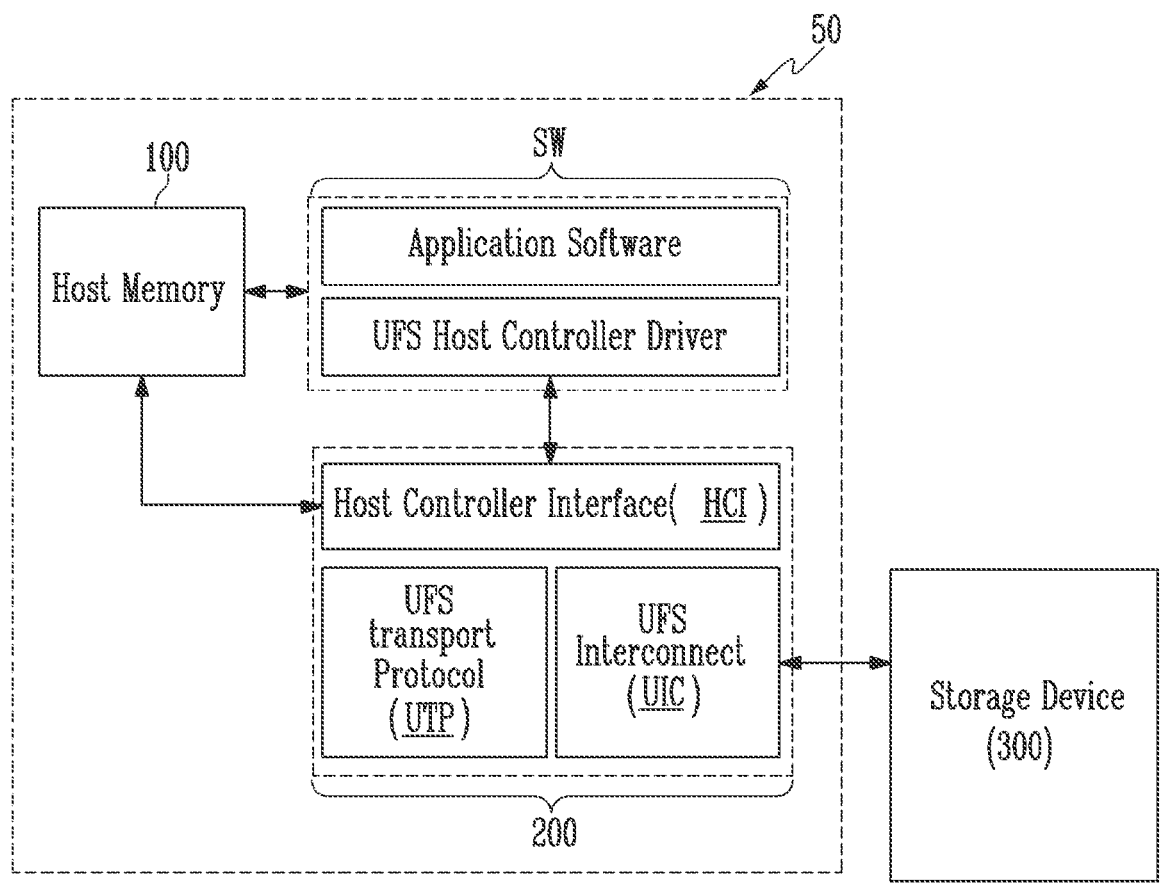
FIG. 2 is a block diagram illustrating an embodiment of a host illustrated in FIG. 1.

FIG. 2 is a block diagram illustrating an embodiment of the host illustrated in FIG. 1.

Referring to FIGS. 1 and 2, the host 50 may communicate with the storage device 300 based on an UFS interface.

The host 50 may include a host memory 100, a software module SW, and a host controller 200 corresponding to a hardware module. The software module SW may include application software and a UFS host controller driver. The application software may be various applications running on the host 50, and the UFS host controller driver may manage the driving of peripheral devices connected to and used by the host 50. The application software and the UFS host controller driver may be loaded into the host memory 100 or may be loaded into an additional memory in the host 50 and executed by a processor.

The host controller 200 may include a UFS transport protocol layer (UTP), a host controller interface (HCI), and a UFS interconnection layer (UIC).

The UTP may provide services for an upper layer (or an application layer). For example, the UTP may generate a PIU for transmission/reception of data or a request or unpack or analyze a received data packet.

The HCI may receive a generated request through the UFS host controller driver and transfer the request to the UTP and may transfer, to the UFS host controller driver, the result of data access received from the UTP.

In some embodiments, the HCI may include the EHS error processor 210. When a PIU generated by the UTP contains an EHS error, the EHS error processor 210 may discard the PIU without transferring the PIU to the storage device 300.

Further, the UIC may communicate with the storage device 300, and may provide information received from the storage device 300 to an upper layer (i.e., the UTP). In some embodiments, the UIC may include a link layer and a physical (PHY) layer. The link layer may be a mobile industry processor interface unified protocol (MIPI UniPro), and the physical (PHY) layer may be MIPI M-PHY.

FIG. 3 is a diagram for describing a data communication unit between a host controller and a memory controller.

Referring to FIGS. 1 and 3, the host controller 200 and the memory controller 310 may communicate with each other using data packets called a PIU.

From the standpoint of a physical device, the host controller 200 may be included in the host 50, and the memory controller 310 may be included in the storage device 300. From the standpoint of interfacing between two devices, one device may transmit a PIU to the other device. In this case, a device which generates a PIU may be referred to as an "initiator device", and a device which receives the generated PIU may be referred to as a "target device." That is, the PIU may be a data packet transmitted between the host 50 and the storage device 300, rather than a data packet unilaterally transmitted from one of the host 50 and the storage device 300 to the other device.

The PIU may include a command PIU, a response PIU, a data out PIU, a data in PIU, and a ready to transfer PIU depending on the operation desired to be performed by the host 50 or the memory controller 310.

The command PIU may be a PIU that is transmitted when the host 50 delivers a command to the storage device 300.

The response PIU may be a PIU that is transferred when the storage device 300 provides a response to the command provided from the host 50.

The data out PIU may be a PIU that is transmitted when the host 50 provides data to the storage device 300.

The data in PIU may be a PIU that is transmitted when the storage device 300 provides data to the host 50.

The ready to transfer PIU may be a PIU that is transmitted when the storage device 300 notifies the host 50 that the storage device 300 is ready to receive a data out PIU from the host 50. The ready to transfer PIU may be transmitted when the storage device 300 has a buffer space sufficient to store data provided from the host 50.

The smallest size of a PIU may be 32 bytes, and the maximum size of a PIU may be 65600 bytes. The format of a PIU may have different sizes depending on the types of PIU.

The PIU may include a basic header segment 61, a transaction specific field (or fields) 62, an EHS 63, and a data segment 64. The basic header segment 61 may have a size of 12 bytes. The basic header segment 61 may be included in common in all PIUs.

The transaction specific field 62 may be included in an area ranging from byte addresses 12 to 30 of the PIU. The transaction specific field 62 may include an exclusive transaction code depending on the type of PIU.

The EHS 63 may be defined when the total EHS length field of the basic header segment 61 has a non-zero value. The EHS 63 may start from a byte address 32 of the PIU. The EHS 63 may be an area in which data can be additionally stored when sufficient information is not included in the basic header segment 61.

The data segment 64 may be included in the data out PIU or the data in PIU and may not be included in the remaining PIUs.

In some embodiments, the EHS 63 and the data segment 64 may be included only in a specific PIU rather than in all PIUs. For example, the command PIU may include the EHS 63, and the data out PIU may not include the EHS 63. When the data out PIU includes the EHS 63, the PIU may be a PIU having an EHS error.

FIG. 4 is a diagram for describing the structure of the basic header segment of a protocol information unit (PIU) included in a command.

Referring to FIG. 4, the basic header segment 61 may include a transaction type, flags, logical unit number (LUN), a task tag, an initiator ID, a command set type, a query function/task management function (Query Function/Task Manag. Function), a response, status, a total EHS length, device information, and a data segment length.

The transaction type may have unique values depending on the types of PIU. Examples of the transaction type depending on the types of PIU are represented, as shown the following Table 1.

TABLE 1

| Case where host provides corresponding PIU to storage device | Transaction type | Case where storage device corresponding PIU to host | Transaction type |
|---|---|---|---|
| Command PIU | 00 0001b | Response PIU | 10 0001b |
| Data out PIU | 00 0010b | Data in PIU | 10 0010b |
| X | X | Ready to transfer PIU | 11 0001b |

The flags may indicate a field having different values depending on transaction types. The logical unit number (LUN) may be a field indicating the number of a logical unit that is to perform the corresponding operation among a plurality of logical units included in a target on which the operation is performed.

The task tag may be a field having different values depending on the transaction types.

The initiator ID may be a field for identifying who is an initiator requesting the corresponding operation. Therefore, in the case where the host generates a PIU and the case where the storage device generates a PIU, the initiator ID may have different values.

The command set type may be a field included in the command PIU and in the response PIU. The command set type may be a field indicating an interface which supports each command as to whether the corresponding command is a SCSI command, a UFS command, or a command defined by a manufacturer.

The query function/task management function may be a field input to the PIU, such as a query request, a query response, or a task management request.

The response field may be a field indicating whether the performance of the requested operation has succeeded or failed. The status field may be a field indicating SCSI status.

The total EHS length (Total EHS Length) may be a field indicating the size of the EHS in units of 32 bits. The total EHS length may be used when the PIU includes an EHS. The EHS length may be the unit of 4 bytes. The value of the total EHS length may be obtained by dividing the total number of bytes of the EHS by 4. The maximum length of the EHS may be 1024 bytes. When the EHS is not used, the total EHS length (Total EHS Length) may be 0.

The device information may include information used only when a specific function is performed.

The data segment length may be a field indicating the length of the data segment of the PIU. When the PIU does not include a data segment, the data segment length may be 0.

Figures 5, 6:
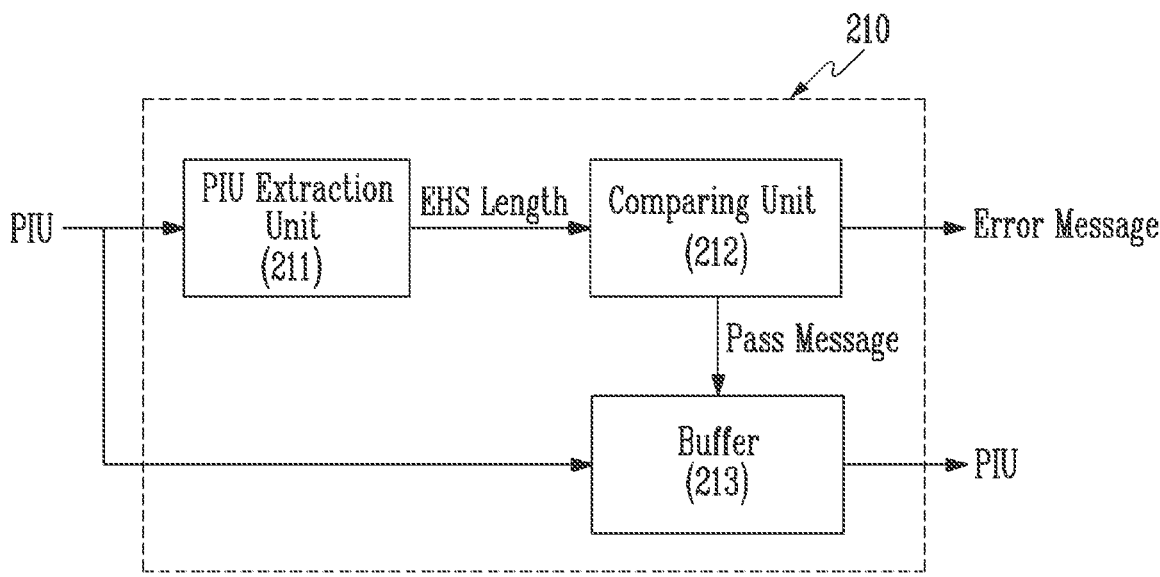
FIG. 5 is a diagram for describing the structure of a command descriptor block.
FIG. 6 is a block diagram illustrating an extra header segment (EHS) error processor according to an embodiment of the present disclosure.

FIG. 5 is a diagram for describing the structure of a command descriptor block.

FIG. 5 may illustrate a security protocol in command descriptor block (CDB) or a security protocol out CDB.

Referring to FIG. 5, a CDB may be included in the transaction specific field of a command PIU. In an example, the CDB may include zero-th to eleventh bytes (0 to 11). The columns of the CDB may indicate respective bits of each byte in the CDB. For example, each byte may include zero-th to seventh bits (0 to 7). The zero-th to seventh bits (0 to 7) of the zero-th byte (0) in the CDB may indicate an operation code (OP code). For example, the operation code of the command may be A2h (security protocol in command) or B5h (security protocol out command).

Hereinafter, in the case of the security protocol in/out commands, the first byte (1) of the CDB may indicate a security protocol. For example, the security protocol may be set to 'ECH'. The second and third bytes (2 and 3) of the security protocol in/out command CDB may indicate a security protocol specific field. For example, when the security protocol is set to 'ECH', the second and third bytes (2 and 3) may designate a Replay Protected Memory Block (RPMB) protocol ID, and the seventh bit (7) of the fourth byte (4) may be set to '0' so as to designate the allocation length or transfer length field to represent the number of bytes to be transferred.

The zero-th to sixth bits (0 to 6) of the fourth byte (4) and the fifth byte (5) of the security protocol in/out command CDB may be a reserved block. The sixth to ninth bytes (6 to 9) of the security protocol in/out command CDB may be an allocation length field or a transfer length field. The tenth byte (10) of the security protocol in/out command CDB may be a reserved block. The eleventh byte (11) of the security protocol in/out command CDB may include a control field. For example, the control field may be '00h'.

FIG. 6 is a block diagram illustrating an EHS error processor according to an embodiment of the present disclosure.

Referring to FIGS. 1 and 6, the EHS error processor 210 may include a PIU extraction unit 211, a comparing unit 212, and a buffer 213. The EHS error processor 210 may perform an EHS error processing operation.

In some embodiments, when the initiator device is the host 50 and the target device is the storage device 300, the EHS error processor 210 may detect a PIU containing an EHS error and may discard the detected PIU without transferring it to the storage device 300. Also, when the initiator device is the storage device 300 and the target device is the host 50, the EHS error processor 210 may detect a PIU containing an EHS error and may discard the detected PIU without transferring it to the UTP.

The PIU extraction unit 211 may receive the PIU provided from the initiator device. The PIU extraction unit 211 may receive the PIU generated by the UTP or provided from the storage device 300. The PIU extraction unit 211 may obtain an EHS length from the received PIU. In some embodiments, the PIU extraction unit 211 may extract the EHS length from the value of the total EHS length field of the PIU. The PIU extraction unit 211 may transmit the EHS length obtained from the PIU to the comparing unit 212.

The received PIU may be a data in PIU, a data out PIU, a command PIU, or a response PIU.

In some embodiments, the EHS length may be the total EHS length included in the basic header segment described in FIG. 4. For example, the PIU extraction unit 211 may extract the EHS length having a value of 'O' from the total EHS length field of the data in PIU.

The comparing unit 212 may compare the EHS length with a first value as to whether the EHS length is equal to or greater than the first value. In some embodiments, the first value may be '4'. The first value may be included in threshold information disclosed in a predefined standard. The threshold information may be information including threshold values required to generate the PIU without causing an EHS error. The first value may be the maximum value that the EHS length can have.

In some embodiments, the comparing unit 212 may generate an error message to be sent to the software module SW when the EHS length is equal to or greater than the first value. The error message may indicate that an EHS error is present in the PIU. When the EHS length is less than the first value, the comparing unit 212 may generate a pass message to be sent to the buffer 213. The pass message may indicate that no EHS error is present in the PIU.

The buffer 213 may temporarily store the provided PIU. In some embodiments, the buffer 213 may be included in the host memory 100 of FIG. 1. The buffer 213 may transfer, in response to the pass message indicating that the EHS length is less than the first value, the PIU from the initiator device to the target device. For example, in response to the pass message, the buffer 213 may transfer the PIU from the UTP to the storage device 300 when the initiator device is the host 50 and may transfer the PIU from the storage device 300 to the UTP when the initiator device is the storage device 300.

In some embodiments, when the EHS error processor 210 performs an EHS error detection operation on the PIU generated by the UTP, the buffer 213 may output the PIU to the storage device 300. When the EHS error processor 210 performs an EHS error detection operation on the PIU received from the storage device 300, the buffer 213 may output the PIU to the UTP.

That is, when an EHS error is detected in the received PIU, the EHS error processor 210 may discard the received PIU, and may send an error message to the software module SW. When no EHS error is detected in the received PIU, the EHS error processor 210 may transmit the PIU generated by the initiator device to the target device.

In FIG. 6, although the EHS error processor 210 included in the host controller 200 is described as performing the EHS error processing operation on the PIU generated by the host 50 or the PIU received from the storage device 300, the present disclosure is not limited thereto, and the memory controller 310 may include an EHS error processor (not illustrated).

In some embodiments, the EHS error processor included in the memory controller 310 may be operated in a manner similar to that of the EHS error processor 210. The EHS error processor included in the memory controller 310 may perform an EHS error processing operation on a PIU received from the host 50 or a PIU generated by the storage device 300. The EHS error processor included in the memory controller 310 may discard a PIU containing an EHS error depending on whether a PIU for which an EHS length and the first value are to be compared with each other contains an EHS error.

Figure 7:
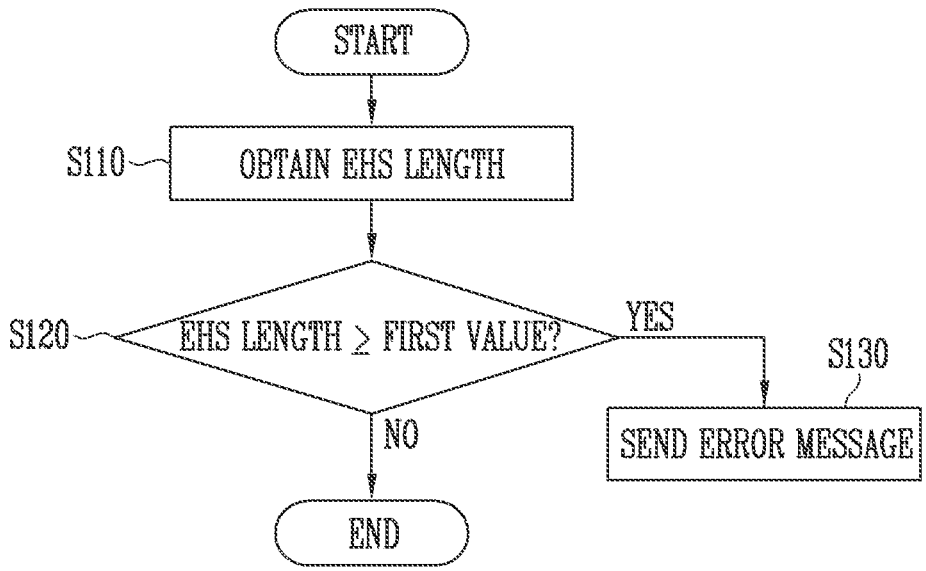
FIG. 7 is a flowchart illustrating the operation of an EHS error processor according to an embodiment of the present disclosure.

FIG. 7 is a flowchart illustrating the operation of an EHS error processor according to an embodiment of the present disclosure.

Referring to FIGS. 2, 6, and 7, an EHS error processing operation performed by the EHS error processor 210 is described below.

At operation S110, the EHS error processor 210 may obtain an EHS length from a PIU. In some embodiments, the EHS error processor 210 may receive the PIU from the UTP or the storage device 300.

At operation S120, the EHS error processor 210 may compare the EHS length with a first value. When the EHS length is equal to or greater than the first value, the EHS error processor 210 may perform operation S130. When the EHS length is less than the first value, the EHS error processor 210 may terminate the EHS error processing operation. In some embodiments, when the EHS length is less than the first value, the EHS error processor 210 may output the PIU to a target device.

At operation S130, the EHS error processor 210 may send an error message to the software module SW.

Figure 8:
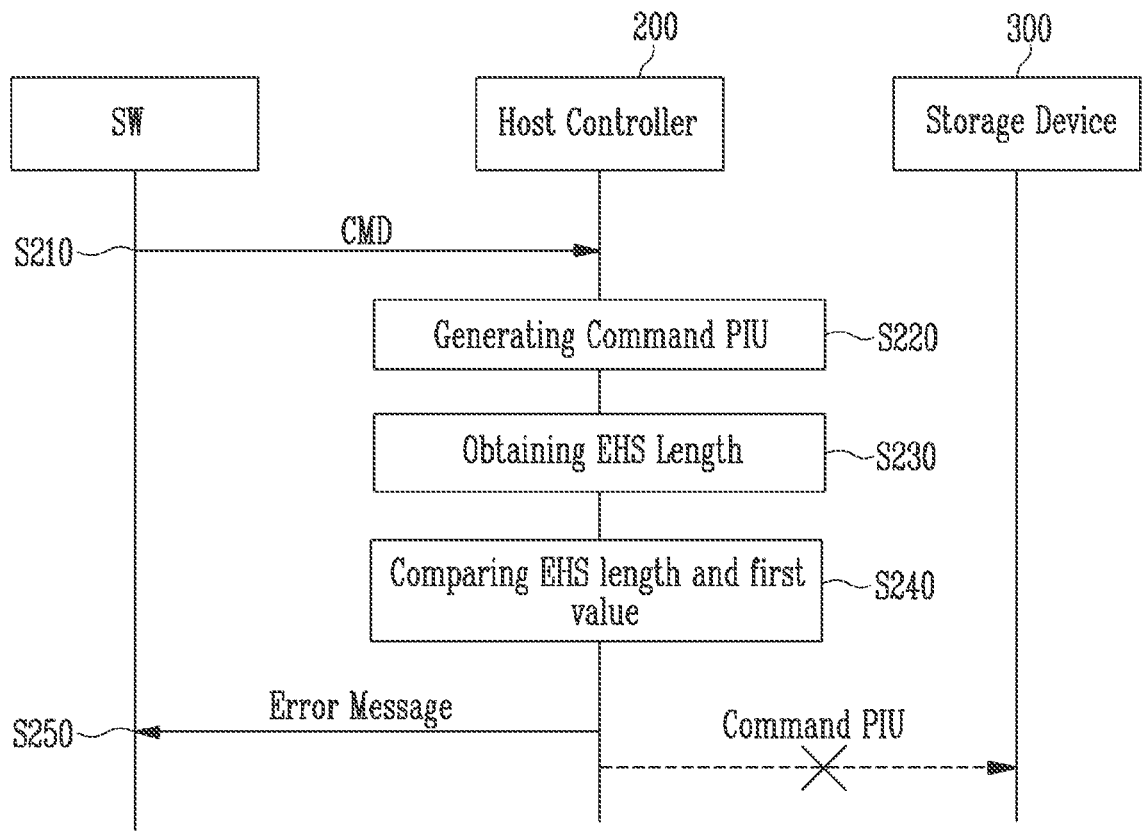
FIG. 8 is a sequence diagram illustrating an error detection operation according to an embodiment of the present disclosure.

FIG. 8 is a sequence diagram illustrating an error detection operation according to an embodiment of the present disclosure.

Referring to FIGS. 2 and 8, the diagram indicating the case where the initiator device is the host 50, the target device is the storage device 300, and a PIU contains an EHS error is illustrated.

At operation S210, the software module SW may transmit a command CMD to the host controller 200.

At operation S220, the host controller 200 may generate a command PIU in response to the command CMD. In some embodiments, the UTP may generate the command PIU.

At operation S230, the host controller 200 may obtain an EHS length from the command PIU.

At operation S240, the host controller 200 may compare the EHS length with a first value.

At operation S250, when the EHS length is equal to or greater than the first value, the host controller 200 may send an error message to the software module SW.

In some embodiments, the HCI of FIG. 2 may perform operations S220 to S250.

Referring to FIG. 8, when an EHS error is detected in the command PIU, the host controller 200 may discard the command PIU. Accordingly, the host controller 200 may not transmit the command PIU to the storage device 300. That is, the HCI performs an EHS error processing operation on the PIU generated by the host 50, and discards the PIU without transmitting the PIU to the storage device 300 when an EHS error is detected in the PIU, thus reducing a processing burden on the storage device 300.

Figure 9:
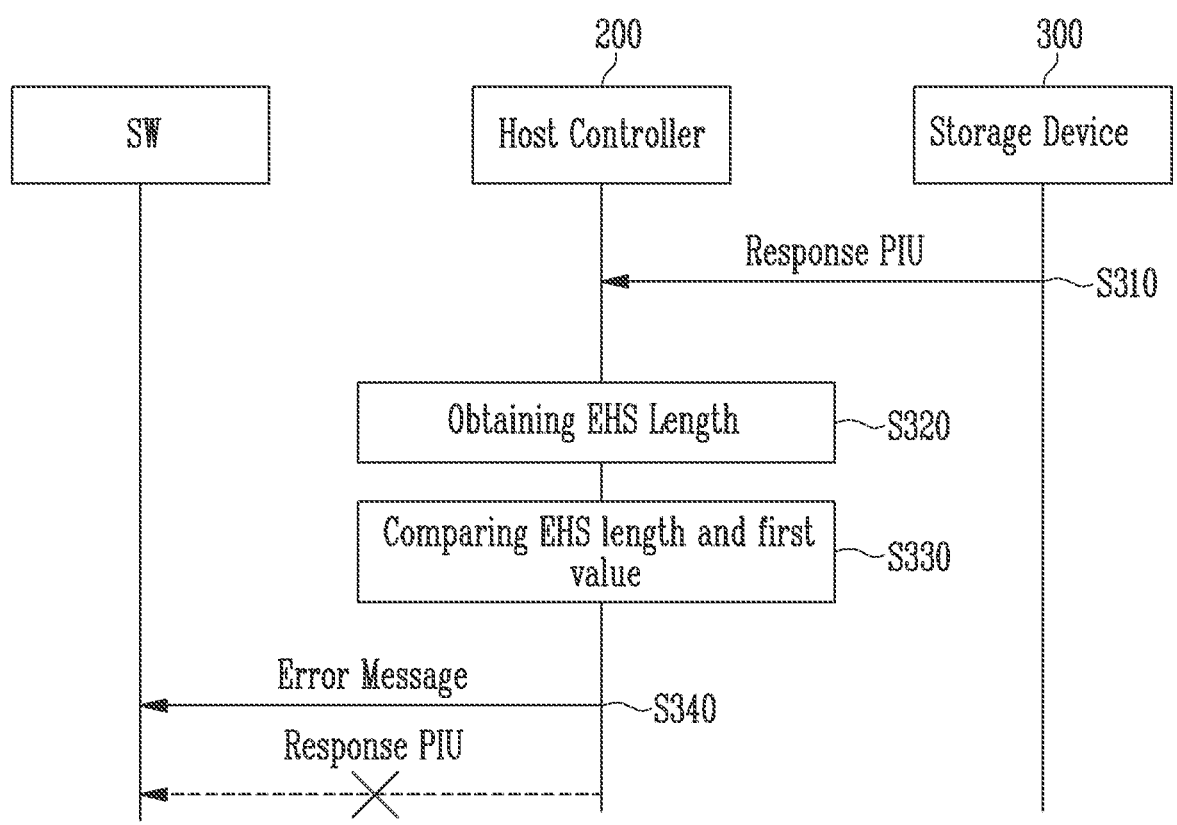
FIG. 9 is a sequence diagram illustrating an error detection operation according to an embodiment of the present disclosure.

FIG. 9 is a sequence diagram illustrating an error detection operation according to an embodiment of the present disclosure. Referring to FIGS. 2 and 9, the diagram indicating the case where
the initiator device is the storage device 300, the target device is the host 50, and a PIU contains an EHS error is illustrated.

At operation S310, the storage device 300 may transmit a response PIU to the host controller 200.

At operation S320, the host controller 200 may obtain an EHS length from the response PIU.

At operation S330, the host controller 200 may compare the EHS length with a first value.

At operation S340, when the EHS length is equal to or greater than the first value, the host controller 200 may send an error message to the software module SW.

In some embodiments, the HCI of FIG. 2 may perform operations S320 to S340.

Referring to FIG. 8, when an EHS error is detected in the response PIU, the host controller 200 may discard the response PIU. Because the UTP discards the response PIU without unpacking or analyzing the response PIU, the software module SW may not receive data related to the response PIU. That is, the HCI performs an EHS error processing operation on the PIU generated by the storage device 300 and discards the PIU without processing the PIU when an EHS error is detected in the PIU, thus reducing a processing burden on the host.

Figure 10:
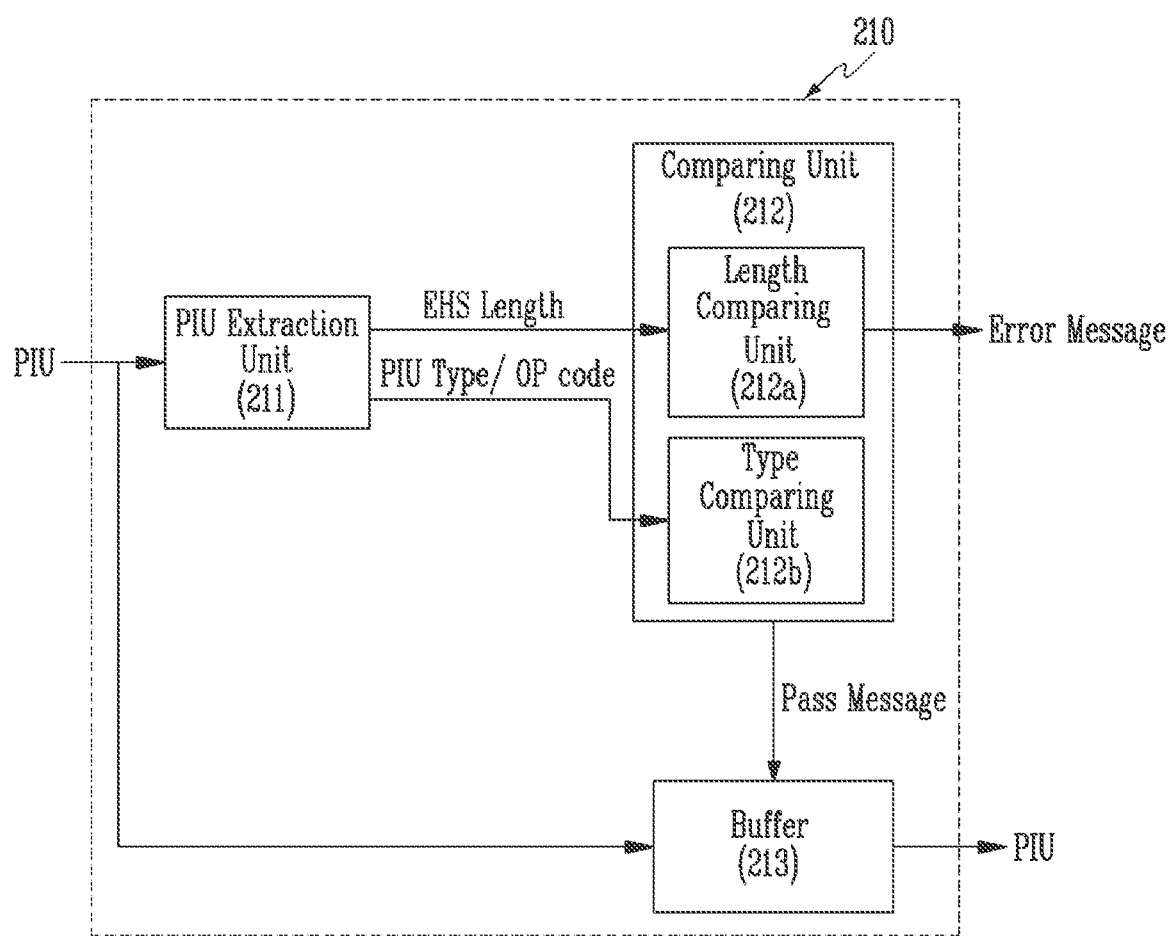
FIG. 10 is a block diagram illustrating an EHS error processor according to an embodiment of the present disclosure.

FIG. 10 is a block diagram illustrating an EHS error processor according to an embodiment of the present disclosure.

Referring to FIGS. 10 and 6, the EHS error processor 210 may include the PIU extraction unit 211, the comparing unit 212, and the buffer 213. The EHS error processor 210 may perform an EHS error processing operation. Because the PIU extraction unit 211 and the buffer 213 of FIG. 10 are similar to the PIU extraction unit 211 and the buffer 213 of FIG. 6, detailed description thereof will be omitted.

The PIU extraction unit 211 may receive a PIU provided from an initiator device. The PIU extraction unit 211 may obtain an EHS length, a PIU type, and an operation code from the received PIU. The PIU type may be a transaction type included in the transaction field of the basic header segment of the PIU. The operation code may be an operation code indicated by zero-th to seventh bits (0 to 7) of a zero-th byte (0) of a CDB included in the transaction specific field of a command PIU.

In some embodiments, the PIU extraction unit 211 may extract the PIU type from the transaction field of the basic header segment of the PIU. For example, the PIU extraction unit 211 may obtain the PIU type by extracting '00 0001b' indicating the command PIU from the transaction field of the command PIU.

In some embodiments, the PIU extraction unit 211 may extract the operation code from zero-th to seventh bits (0 to 7) of a zero-th byte (0) in CDB of the transaction specific field of the command PIU. For example, the PIU extraction unit 211 may obtain the operation code by extracting 'A2h' indicating security protocol in command PIU from the CDB of the security protocol in command PIU.

The PIU extraction unit 211 may transmit the EHS length, the PIU type, and the operation code extracted from the PIU to the comparing unit 212.

The comparing unit 212 may include a length comparing unit 212a and a type comparing unit 212b. In some embodiments, the PIU extraction unit 211 may transmit the EHS length to the length comparing unit 212a and may transmit the PIU type and the operation code to the type comparing unit 212b.

The length comparing unit 212a may compare the EHS length with a first value. In some embodiments, the first value may be 4. When the EHS length is equal to or greater than the first value, the length comparing unit 212a may generate an error message. When the EHS length is less than the first value, the length comparing unit 212a may compare the EHS length with a second value. In some embodiments, the second value may be 0.

When the EHS length is equal to the second value, the length comparing unit 212a may output a pass message to the buffer 213. When the EHS length is not equal to the second value, the type comparing unit 212b may compare the PIU type with a first type.

In some embodiments, when the EHS length is not equal to the second value, the length comparing unit 212a may output a type comparison signal to the type comparing unit 212b. The type comparing unit 212b may compare the PIU type with the first type based on the type comparison signal.

In some embodiments, the first type may be a command or a response. For example, when the initiator device is the host and the target device is the storage device, the first type may be a command. When the initiator device is the storage device and the target device is the host, the first type may be a response.

In some embodiments, when the PIU type is identical to the first type, the type comparing unit 212b may output a pass message to the buffer 213. When the PIU type is not identical to the first type, the type comparing unit 212b may output an error message.

In some embodiments, when the PIU type is a command, the type comparing unit 212b may compare the type indicated by the operation code with a second type. The second type may be a security protocol in type or a security protocol out type.

In some embodiments, when the type indicated by the operation code is identical to the second type, the type comparing unit 212b may output a pass message to the buffer 213. When the type indicated by the operation code is not identical to the second type, the type comparing unit 212b may output an error message.

Figure 11:
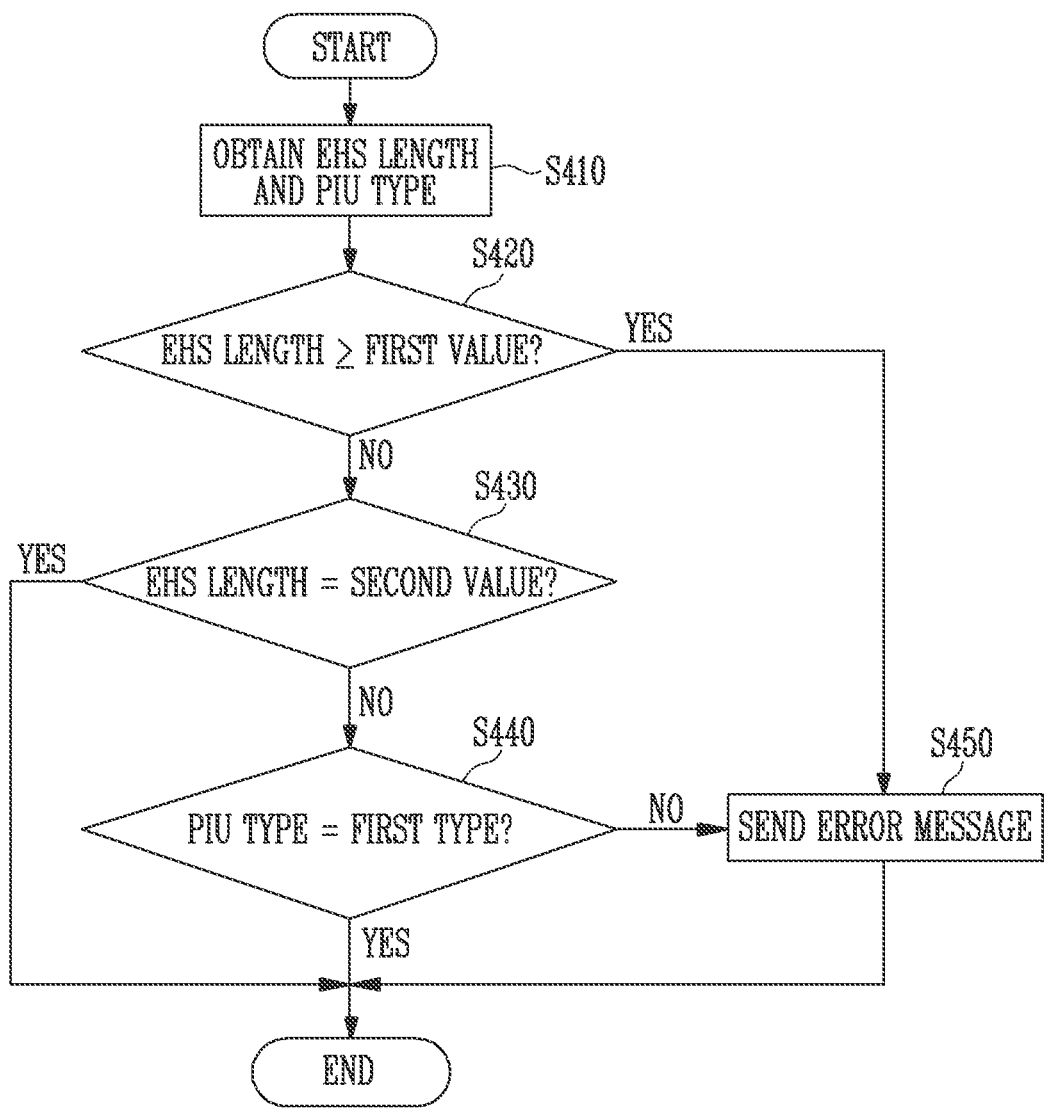
FIG. 11 is a flowchart illustrating the operation of an EHS error processor according to an embodiment of the present disclosure.

FIG. 11 is a flowchart illustrating the operation of an EHS error processor according to an embodiment of the present disclosure.

Referring to FIGS. 2, 9, and 11, an EHS error processing operation performed by the EHS error processor 210 is described below.

At operation S410, the EHS error processor 210 may obtain an EHS length and a PIU type from a PIU. In some embodiments, the PIU extraction unit 211 may receive the PIU from the UTP or the storage device 300.

At operation S420, the EHS error processor 210 may compare the EHS length with a first value. When the EHS length is less than the first value, the EHS error processor 210 may perform operation S430. When the EHS length is equal to or greater than the first value, the EHS error processor 210 may perform operation S450.

At operation S430, the EHS error processor 210 may compare the EHS length with a second value. When the EHS length is equal to the second value, the EHS error processor 210 may terminate the EHS error processing operation. In some embodiments, when the EHS length is equal to the second value, the EHS error processor 210 may output the PIU to the target device. When the EHS length is not equal to the second value, the EHS error processor 210 may perform operation S440.

At operation S440, the EHS error processor 210 may compare the PIU type with a first type. The first type may be a command or a response. When the PIU type is identical to the first type, the EHS error processor 210 may terminate the EHS error processing operation. In some embodiments, when the PIU type is identical to the first type, the EHS error processor 210 may output the PIU to the target device. When the PIU type is not identical to the first type, the EHS error processor 210 may perform operation S450.

At operation S450, the EHS error processor 210 may send an error message to the software module SW.

Figure 12:
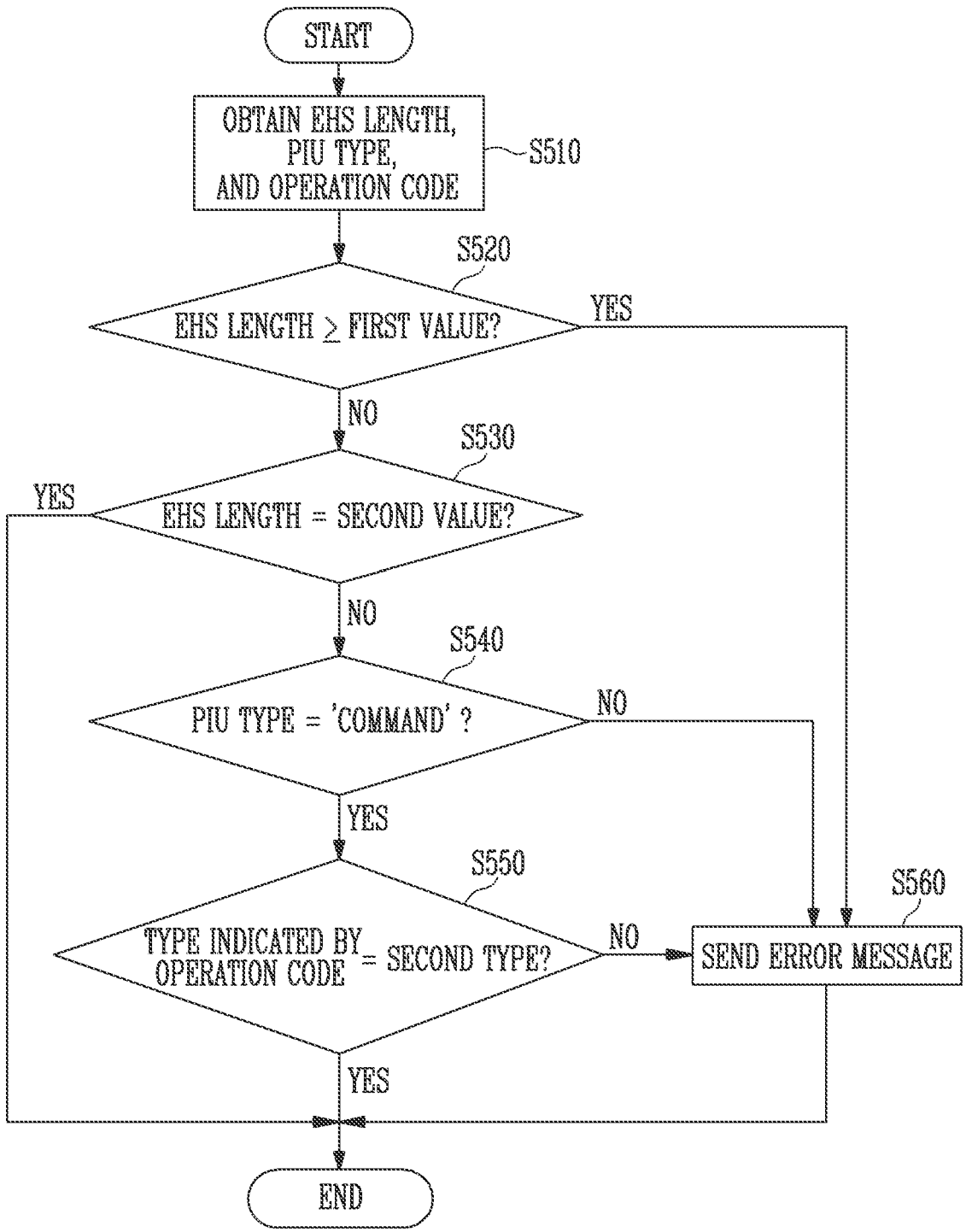
FIG. 12 is a flowchart illustrating the operation of an EHS error processor according to an embodiment of the present disclosure.

FIG. 12 is a flowchart illustrating the operation of an EHS error processor according to an embodiment of the present disclosure.

Referring to FIGS. 2, 9, and 12, an EHS error processing operation performed by the EHS error processor 210 is described below.

At operation S510, the EHS error processor 210 may obtain an EHS length, a PIU type, and an operation code from a PIU. In some embodiments, the PIU extraction unit 211 may receive the PIU from the UTP or the storage device 300.

At operation S520, the EHS error processor 210 may compare the EHS length with a first value. When the EHS length is equal to or greater than the first value, the EHS error processor 210 may perform operation S560. When the EHS length is less than the first value, the EHS error processor 210 may perform operation S530.

At operation S530, the EHS error processor 210 may compare the EHS length with a second value. When the EHS length is equal to the second value, the EHS error processor 210 may terminate the EHS error processing operation. In some embodiments, when the EHS length is equal to the second value, the EHS error processor 210 may output the PIU to the target device. When the EHS length is not equal to the second value, the EHS error processor 210 may perform operation S540.

At operation S540, the EHS error processor 210 may compare the PIU type with a first type. The first type may be a command. When the PIU type is identical to the first type, the EHS error processor 210 may perform operation S550. When the PIU type is not identical to the first type, the EHS error processor 210 may perform operation S560.

At operation S550, the EHS error processor 210 may compare the type indicated by the operation code with a second type. The second type may be a security protocol in type or a security protocol out type. When the type indicated by the operation code is identical to the second type, the EHS error processor 210 may terminate the EHS error processing operation. When the type indicated by the operation code is not identical to the second type, the EHS error processor 210 may perform operation S560.

At operation S560, the EHS error processor 210 may send an error message to the software module SW.

Embodiments of the present disclosure includes an electronic device that is capable of detecting an error in the field of a protocol information unit. The embodiments of the present disclosure may detect an error in the field of a protocol information unit before the protocol information unit is processed, and may discard the erroneous protocol information unit, thus reducing a burden on a storage system.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. An electronic device, comprising:
a memory device; and
a controller configured to receive an inbound protocol information unit (PIU) from an external device and control the memory device based on the inbound PIU,
wherein the inbound PIU comprises:
a basic header segment including information about an extra header segment (EHS) length; and
an extra header segment defined by the EHS length, and
wherein the controller is further configured to generate an error message depending on whether the inbound PIU includes an error related to the extra header segment.

2. The electronic device according to claim 1, wherein the controller is configured to generate the error message when the EHS length is equal to or greater than a first value.

3. The electronic device according to claim 2, wherein:
the inbound PIU further comprises a transaction specific field configured to identify a type of the inbound PIU, and
the controller is configured to, when the EHS length is less than the first value and is not equal to a second value, generate the error message depending on whether the type of the inbound PIU is a first type.

4. The electronic device according to claim 3, wherein:
the first value is 4,
the second value is 0, and
the first type is a command or a response.

5. The electronic device according to claim 4, wherein the controller is further configured to:

generate an outbound PIU of an identical format to the inbound PIU, and
output the outbound PIU to the external device when the type of the outbound PIU is the command.

6. The electronic device according to claim 4, wherein the controller is configured to control the memory device depending on the inbound PIU when the type of the inbound PIU is the response.

7. The electronic device according to claim 4,
further comprising a software module configured to execute instructions stored in the memory device,
wherein the controller is configured to, when the type of the PIU is not the first type, output the error message to the software module.

8. The electronic device according to claim 4, wherein:
the transaction specific field is further configured to identify an operation code of the inbound PIU, and
the controller is configured to generate, when the first type is the command, the error message depending on whether a type indicated by the operation code of the inbound PIU is a second type.

9. The electronic device according to claim 8, wherein the controller is configured to generate the error message when the type indicated by the operation code of the inbound PIU is not the second type.

10. The electronic device according to claim 8, wherein the controller is further configured to:
generate an outbound PIU of an identical format to the inbound PIU, and
output the outbound PIU to the external device when the first type is the command and the type indicated by the operation code of the PIU is the second type.

11. The electronic device according to claim 10, wherein the second type is a security protocol in type or a security protocol out type.

12. The electronic device according to claim 1, wherein:
the controller comprises a host controller interface (HCI) configured to provide interfacing between the electronic device and the external device, and
the host controller interface generates the error message depending on whether the PIU includes an error related to the extra header segment.

13. A method of operating an electronic device including a memory device and a controller configured to control the memory device, the electronic device communicating with an external device through a protocol information unit (PIU), the method comprising:
receiving, by the controller, the PIU from the external device;
obtaining, by the controller, an extra header segment (EHS) length from the PIU; and
generating, by the controller, an error message when the EHS length is equal to or greater than a first value.

14. The method according to claim 13, further comprising generating, by the controller, the error message depending on whether a type of the PIU is a first type when the EHS length is less than the first value and is not equal to a second value.

15. The method according to claim 14, wherein:
the first value is 4,
the second value is 0, and
the first type is a command or a response.

16. The method according to claim 14, wherein the generating, by the controller, the error message depending on whether the type of the PIU is the first type when the EHS length is less than the first value and is not equal to the second value comprises generating, by the controller, the error message when the type of the PIU is not the first type.

17. The method according to claim 14, wherein the generating, by the controller, the error message depending on whether the type of the PIU is the first type when the EHS length is less than the first value and is not equal to the second value comprises generating, by the controller, when the first type is a command, the error message depending on whether a type indicated by an operation code of the PIU is a second type when the type of the PIU is the first type.

18. The method according to claim 17, wherein the generating, by the controller, the error message depending on whether the type indicated by the operation code of the PIU is the second type when the type of the PIU is the first type comprises generating, by the controller, the error message when the type indicated by the operation code of the PIU is not the second type.

19. The method according to claim 17, wherein the second type is a security protocol in type or a security protocol out type.

20. A storage device comprising:
   a memory device; and
   a controller configured to:
      control, based on a protocol information unit (PIU), the memory device; and
discard the PIU when the PIU includes a value of an extra header segment (EHS) length and the value is greater than a threshold.

* * * * *